W. E. MILLAR.
ENDLESS FILM AND REEL DEVICE FOR EXHIBITING PICTURES, &c.
APPLICATION FILED DEC. 30, 1915.
1,211,955.  Patented Jan. 9, 1917.
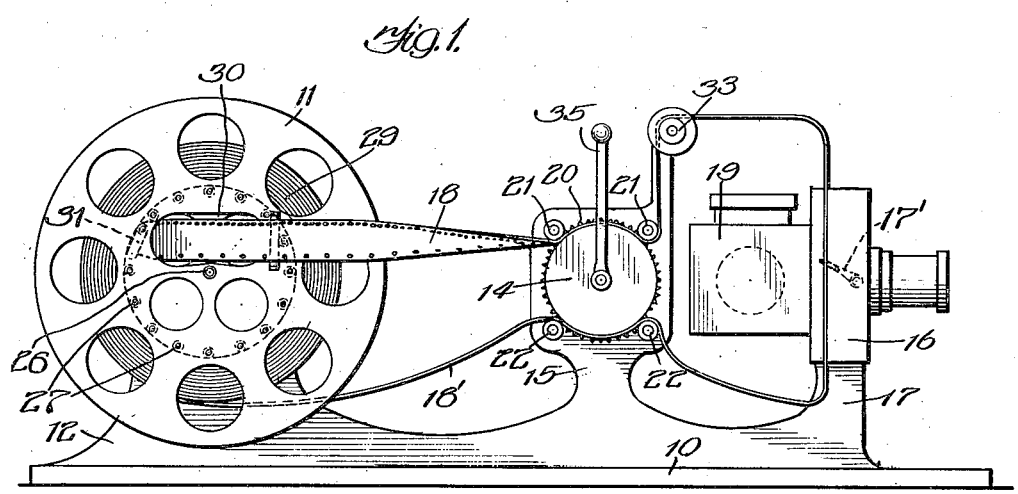
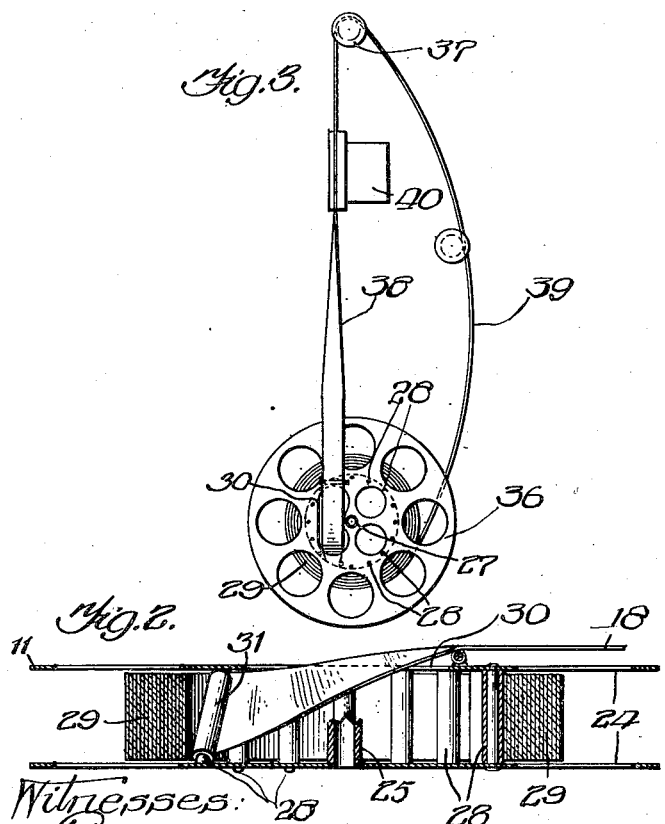

UNITED STATES PATENT OFFICE.

WILLIAM E. MILLAR, OF CHICAGO, ILLINOIS.

ENDLESS-FILM AND REEL DEVICE FOR EXHIBITING PICTURES, &c.

1,211,955.   Specification of Letters Patent.   Patented Jan. 9, 1917.

Application filed December 30, 1915. Serial No. 69,359.

*To all whom it may concern:*

Be it known that I, WILLIAM E. MILLAR, a citizen of the United States, and a resident of Chicago, in the county of Cook and State of Illinois, have invented certain new and useful Improvements in Endless-Film and Reel Devices for Exhibiting Pictures, &c.; and I do hereby declare that the following is a full, clear, and exact description thereof, reference being had to the accompanying drawings, and to the characters of reference marked thereon, which form a part of this specification.

This invention relates to an improved device for exhibiting pictures, advertising signs, or the like, either of that kind constituting a part of and operating in connection with a moving picture machine or constituting a part of a mechanism to exhibit still pictures or the text of an advertisement.

When the invention is embraced in a machine which operates to exhibit moving pictures, the embodiment of the invention embraces a projecting apparatus of any suitable character including the light to illuminate the picture, and a lens to project it, together with approved means for feeding the film on which the pictures are impressed across the projecting area of the apparatus.

When the invention is embraced in a device for exhibiting still pictures, the film or ribbon bearing the same will be passed in front of a suitable illuminating lamp and the subject matter of the sign may be read directly from the strip which bears the same or may be projected through a transparent strip bearing the same onto a screen.

The invention is also capable of use as a portable or household moving picture apparatus, and in fact may be used in connection with any moving picture outfit where it is desired to exhibit continuously the subject matter of a given picture or pictures, advertising announcement, etc.

The object of the invention is to provide an apparatus of this character having an endless film or tape on which the pictures or other subject matter to be exhibited are impressed, the apparatus embracing in addition to the usual projecting or illuminating means through which the film or tape is passed, a reel on which the same film or tape may be simultaneously wound and unwound so that said tape may be an endless tape. By the use of this invention it becomes possible to exhibit the subject matter impressed on the film or tape continuously and without the necessity of stopping the machine for the purpose of removing a reel therefrom and replacing another reel thereon.

A machine embodying my invention is especially desirable when used for window and like public advertising inasmuch as the machine requires no attention after it has been set in operation. It is also valuable when used in connection with a portable or household machine which is adapted to be used in homes where a limited length of moving picture film is adapted to be exposed. However, the salient elements of the invention are capable of larger uses in public exhibition moving picture machines inasmuch as the reel may be adapted to contain a length of film, which is now contained on a number of reels, connected together as a single continuous film, so that a sufficient length of film for a single show or such public exhibition may be thus embraced on a single endless film and the show continued without interruption to change reels.

I have shown in the drawings two embodiments of my invention, one adapting it to a moving picture projecting machine, and the other adapting it to a machine for exhibiting, either by direct illumination or by enlarged projection, still pictures, or texts of announcements.

The invention consists in the combination and arrangement of the parts shown in the drawing and described in the specification and is pointed out in the appended claims.

As shown in the drawings: Figure 1 is a side elevation of the principal parts of a moving picture machine or apparatus embodying my invention. Fig. 2 is a horizontal section of the reel on which the endless film is wound and from which it is unwound. Fig. 3 is a side elevation of a machine for exhibiting a series of still pictures, advertising announcements, etc.

First referring to the construction shown in Figs. 1 and 2, 10 designates the base of the machine and 11 designates as a whole a reel supported on a standard 12 rising therefrom. 14 designates one form of film feed wheel which is supported on a standard 15 rising from the base and 16 designates as a whole the projecting end of the machine which is supported on a standard 17 rising from said base. I have not herein shown the details of the projecting mechanism but have indicated the usual finger 17' by which that portion of the film 18 which passes through the projecting device is given an intermittent or step by step movement necessary to produce the moving picture. It will be understood that said projecting means and the illuminating means 19 in rear thereof may be of any suitable or preferred type. The feed wheel 14 as herein shown is a continuous rotating feed wheel and is provided with teeth or spurs 20 to engage in the usual perforations in the film by which the film is continuously fed to the projecting portion of the machine. Said film on the pay out side of the machine is held against the feed wheel by suitably located rollers 21, 21, and is held against the feed wheel at diametrically opposite portions thereof, in the return portion of the film, by other suitably located rollers 22. The reel 11 herein shown is made generally like the reel illustrated in my prior application for United States Letters Patent, Serial No. 64983. Said reel comprises end plates or heads 24 having an axial sleeve 25 which is adapted to be mounted on a suitable stud 27 carried by the frame and keyed or otherwise locked thereto. Said reel comprises in addition an annular series of spacing pins 27 on which are mounted a plurality of anti-friction rollers 28; said annular series of rollers constituting a support for the reel roll designated by 29. The said annular series of friction rollers 28 inclose a central space around the axial sleeve 25, and, as in the reel shown in my aforesaid application, the film is paid out off of the roll of film supported on the reel through said central space, the film being led from the space to the exterior of the reel through an elongated opening 30 in one of the reel heads or plates. The reel is guided from the annular series of supporting anti-friction sleeves by an obliquely disposed anti-friction sleeve or roller 31 located adjacent to one end of the release or outlet opening 30, as in the reel shown in the aforesaid prior application. The film after being threaded outwardly from said opening 30 is threaded over the feed wheel or roller 14, and between the same and the hold down rollers 21, thence over a guide roller 33, thence through the projecting portion of the machine and the return portion 18′ of the film is carried backwardly under the feed wheel or roller 14, being held thereagainst by the rollers 22 and is finally carried to the outer side of the roll 29. After the film has been threaded through the machine, the free ends are cemented together to constitute an endless film. When the machine is thus adjusted it is in a position to be operated continuously, the film being fed off the inner side of the roll through the central portion of the reel and being returned to the outer side of the roll. It will thus be understood that the machine does not require any attention if it be power driven and requires only the attention of the operator if it be hand driven, as through the medium of a hand lever 35.

Referring now to the construction shown in Fig. 3, organized for the purpose of successively exhibiting a series of still pictures on a reel or band or successively exhibiting the subject matter of an advertising announcement, the same is made as follows: 36 designates a reel having the characteristics of the reel hereinbefore described. 37 designates a rotative feed roller or wheel located a distance from the reel and in the bight of an external loop of the endless film comprising the portions 38, 39. The said feed roller or wheel 37 may be intermittently rotated in the manner of the feed roller or wheel 14 shown in Fig. 1, or said feed roller or wheel 37 may be slowly rotated to pay the film off the reel 36 and direct it backwardly thereon as desired. Located between the wheel or roll 37 and the reel 36 is a light box 40 in which may be located any suitable form of illuminating device to illuminate the pictures, advertising medium, etc., carried by or superimposed on the film or band. Said light box may constitute a means for illuminating said subject matter to be directly read or may be used in coöperation with a projecting device for magnifying and projecting said subject matter on a suitably located screen.

The foregoing described embodiments of my invention illustrate two practical applications thereof, from which it will be understood that the essential principles of the device are capable of variations substantially different from the illustrative embodiments herein shown. It will be observed that a feature of the device common to both illustrated embodiments is a reel adapted to support a film or like roll wherein the film or band constituting the roll is unwound from the reel at the inner or outer side of the roll and is wound thereon at the other side of the roll, the film or band being endless, and said film or band bearing a series of photographs or the like which are successively exposed while passing through the illuminating or projecting area of the machine. It is to be understood therefore that my invention is not limited to the structural details shown and described except as such details may hereinafter be made the subject of specific claims or as may be imposed by the prior art.

I claim as my invention:—

1. An endless film and reel device for exhibiting pictures, comprising, in combination with an endless film or strip, of a reel comprising spaced heads and an annular series of film roll supporting and guide rollers, one of which rotates on an axis oblique to the axes of rotation of the other rollers, one of the heads provided adjacent to the oblique roller with an outlet opening through which the film is passed in a plane parallel to the plane of said latter head and guiding means engaging the looped portion of the film exterior to said reel.

2. An endless film and reel device for exhibiting pictures, comprising, in combination with an endless film or strip, of a reel comprising spaced heads and an annular series of film roll supporting and guide rollers, one of which rotates on an axis oblique to the axes of rotation of the other rollers, one of the heads provided adjacent to the oblique roller with an outlet opening through which the film is passed in a plane parallel to the plane of said latter head, guiding means engaging the looped portion of the film exterior to said reel and a guide roller exterior to and mounted on said latter head adjacent to said outlet opening.

3. An endless film and reel device for exhibiting pictures, comprising, in combination with an endless film or strip, of a reel comprising spaced heads and an annular series of closely spaced film roll supporting and guide rollers of small diameter, one of which rotates on an axis oblique to the axes of rotation of the other rollers, one of the heads provided adjacent to the oblique roller with an outlet opening through which the film is passed in a plane parallel to the plane of said latter head, rotating guiding means engaging the looped portion of the film exterior to the reel and rotating on an axis parallel to the axis of the reel, and an exhibiting device through which said exterior looped portion of the film passes.

In testimony, that I claim the foregoing as my invention I affix my signature in the presence of two witnesses, this 27th day of December A. D. 1915.

WILLIAM E. MILLAR.

Witnesses:
W. L. HALL,
REBECCA WILLNER.